INVENTORS
FRANS D. CLAESSENS
THEODORE F. HEIN
BY
ATTORNEYS

United States Patent Office 3,439,433
Patented Apr. 22, 1969

3,439,433
METHOD OF DRYING A MOULDED CERAMIC ARTICLE ON A FORM
Frans D. Claessens and Theodore F. Hein, Maastricht, Netherlands, assignors to N.V. Koninklijke Sphinx-Ceramique v/h Petrus Regout, Maastricht, Netherlands, a Dutch limited-liability company
Filed Nov. 7, 1966, Ser. No. 592,447
Claims priority, application Netherlands, Nov. 26, 1965, 6515375
Int. Cl. F26b 25/00
U.S. Cl. 34—103                     1 Claim

ABSTRACT OF THE DISCLOSURE

Ceramic products dried while being supported by a perforated support formed of nonporous material and being shaped closely to conform to the contours of the ceramic product.

---

Figure 1:
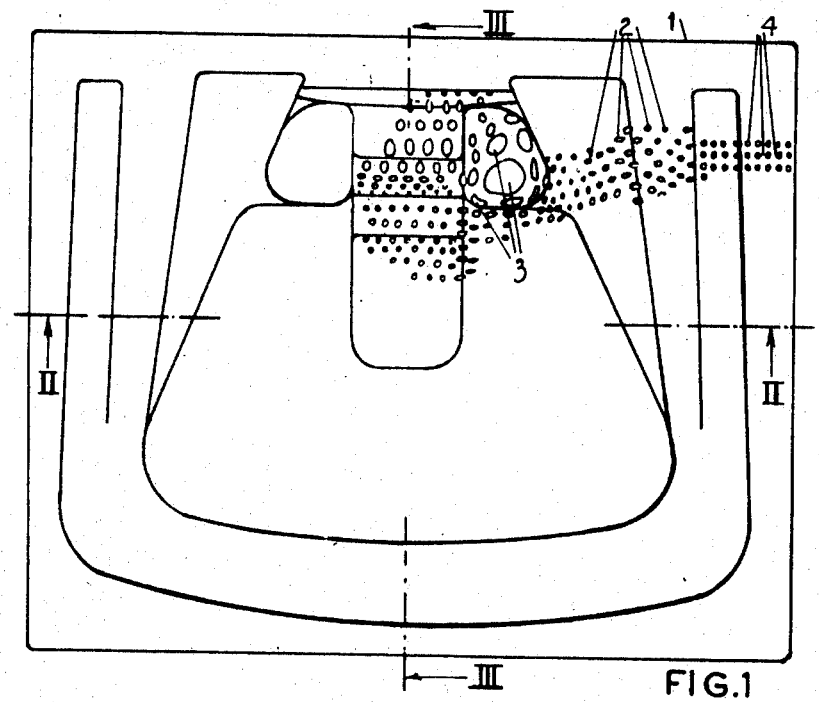

The invention relates to a support for moulded ceramic products which are required to be dried, the internal shape of said support matching the shape of the underside of the product. Prior art supports of this type were made from plaster. These plaster supports can draw water from the product and then later on give such water up, so that drying is promoted. However, a disadvantage of these prior art supports is that they are very heavy, so that their handling, particularly together with the product for drying, is difficult. The object of the invention is to provide a support which is very light in weight and yet permits good drying.

According to the invention, to this end, the support consists of a perforated plastics panel. It has surprisingly been found that although apparently the product can only give up moisture at the site of a perforation, good uniform drying is obtained with such supports. Drying would in fact appear to be faster with the support according to the invention. The explanation of this phenomenon may be that as a result of the slight deformation occurring during drying, the product does not bear uniformly on the support, so that moisture can be transferred even between the dense portions of said support and the product. The support according to the invention is very light in weight and also relatively robust, so that its life is practically unlimited.

According to the invention, the perforations can be larger in those portions which have been subjected to considerable deformation than in the other portions of the panel. The surface of the product is most likely to be covered excessively in these portions and the fact that the perforations are larger there eliminates this disadvantage.

The invention also relates to a method of manufacturing a support of the type described. According to the invention, a support of this type can be manufactured by bringing a flat panel formed with a uniform perforation into the required shape. With such a manufacturing method, the required variation in the size of the perforations is obtained automatically.

Figure 2:
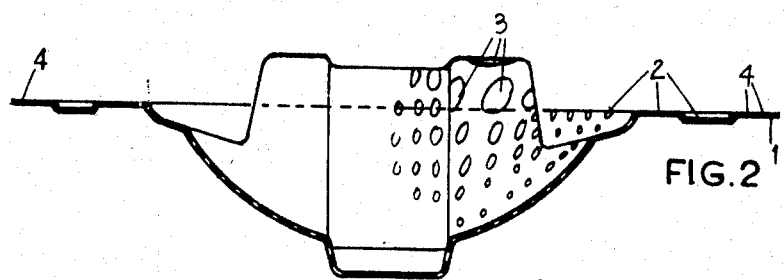
Figure 3:
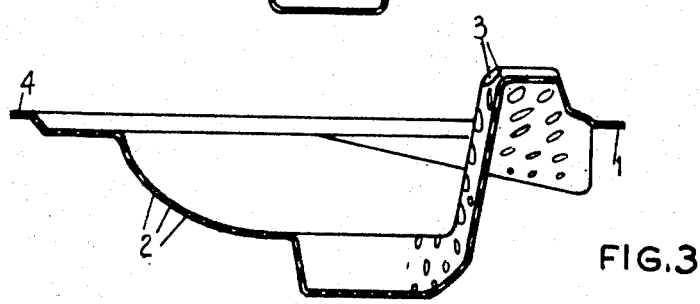

The invention will be explained in detail in the following description of one exemplified embodiment of a support according to the invention with reference to the drawing, wherein:

FIG. 1 illustrates a support according to the invention for a wash-stand;
FIG. 2 illustrates the support of FIG. 1 in cross-section on the line II—II;
FIG. 3 illustrates the support of FIG. 1 in cross-section on the line III—III.

The support illustrated in the drawing consists of a plastics panel 1, the internal shape of which matches the underside of the product which it is required to support, in this case a wash-basin. The support has perforations 2 of a size varying according to the shape of the support in different places. For example, the perforations are very large at the regions 3 of considerable deformation. For the sake of clarity, the perforations are shown only partially.

The different sizes of the perforations can be produced automatically if it is started from a flat panel which has uniform perforations. The largest perforations then form in those regions which are subjected to the greatest deformation. The initial perforation is still visible at 4 in FIG. 1 at the edge of the panel 1.

When the product lies on the support according to the invention, satisfactory drying is obtained beacuse a certain amount of shrinkage occurs when drying starts, so that the wash-basin does not bear uniformly on the support. Consequently, drying air can pass to the surface portions of the wash-basin which are not situated directly opposite a perforation, such air passing between the said portions and the support. Drying is influenced favourably as a result of the much larger perforations at those portions of the support which have been subjected to considerable deformation, e.g. the portions 3.

What we claim is:
1. The method of manufacturing a support and drying ceramic products, which comprises:
   uniformly perforating a flat panel,
   deforming the perforated panel to match the underside of the ceramic product and enlarging the perforations preferentially in the regions of greatest deformation,
   and then placing the ceramic product in the support and allowing the product to dry.

References Cited
UNITED STATES PATENTS
2,645,034  7/1953  Hupp _____ 34—99
3,284,917  11/1966 Foote _____ 34—103 XR JAMES W. WESTHAVER, *Primary Examiner.*
HARRY B. RAMEY, *Assistant Examiner.*